(12) United States Patent
Zechner (10) Patent No.: US 11,281,893 B2
(45) Date of Patent: Mar. 22, 2022

(54) METHOD AND DEVICE FOR MODIFYING THE AFFECTIVE VISUAL INFORMATION IN THE FIELD OF VISION OF AN USER

(71) Applicant: Stefan Zechner, Annenheim (AT)

(72) Inventor: Stefan Zechner, Annenheim (AT)

(*) Notice: Subject to any disclaimer, the term of this patent is extended or adjusted under 35 U.S.C. 154(b) by 0 days.

(21) Appl. No.: 16/311,401

(22) PCT Filed: Jun. 21, 2017

(86) PCT No.: PCT/EP2017/065265
§ 371 (c)(1),
(2) Date: Dec. 19, 2018

(87) PCT Pub. No.: WO2017/220667
PCT Pub. Date: Dec. 28, 2017

(65) Prior Publication Data
US 2020/0074150 A1    Mar. 5, 2020

(30) Foreign Application Priority Data

Jun. 21, 2016 (AT) .................................. A 304/2016
Jan. 16, 2017 (AT) .................................. A 12/2017
Jan. 17, 2017 (EP) .................................. 17151715

(51) Int. Cl.
G06K 9/00    (2006.01)
G06T 11/00   (2006.01)
G06T 19/00   (2011.01)

(52) U.S. Cl.
CPC ..... *G06K 9/00281* (2013.01); *G06K 9/00248* (2013.01); *G06K 9/00288* (2013.01); *G06T 11/005* (2013.01); *G06T 19/006* (2013.01)

(58) Field of Classification Search
None
See application file for complete search history.

(56) References Cited

U.S. PATENT DOCUMENTS 10,067,516 B2 * 9/2018 Ramagem .......... G05D 23/1902
2004/0264780 A1* 12/2004 Zhang .................... G06F 16/58
382/224

(Continued)

FOREIGN PATENT DOCUMENTS

| DE | 10 2013 017 820 | 4/2015 |
| EP | 2 124 186 | 11/2009 |
| EP | 2 829 221 | 1/2015 |
| WO | 2010/022351 | 2/2010 |
| WO | 2015/068168 | 5/2015 |

OTHER PUBLICATIONS

Austrian Office Action for Application No. A304/2016, dated Oct. 7, 2016.

(Continued)

*Primary Examiner* — Nancy Bitar
(74) *Attorney, Agent, or Firm* — Nixon & Vanderhye (57) ABSTRACT

Disclosed is to a method and to a device for modifying the affective visual information in the field of vision of a user of the device. The device includes at least one image sensor and at least one display. The method includes the following steps: Detecting an image in the field of vision of the device using an image sensor, carrying out a face recognition using the detected image for recognizing at least one face, determining the position of the eyes and mouth of the detected face, calculating a superimposition area in the display of the device in accordance with the determined positions of the eyes and mouth, superimposing the field of vision of a user of the device with alternative image data in the calculated superimposition of the display.

13 Claims, 7 Drawing Sheets

(56) References Cited

U.S. PATENT DOCUMENTS

| | | | | |
|---|---|---|---|---|
| 2006/0251338 | A1* | 11/2006 | Gokturk | G06F 16/583 382/305 |
| 2010/0066840 | A1* | 3/2010 | Asukai | H04N 5/23219 348/207.1 |
| 2010/0188520 | A1* | 7/2010 | In | G06K 9/00308 348/222.1 |
| 2016/0217621 | A1* | 7/2016 | Raghoebardajal | G06T 19/006 |
| 2016/0270718 | A1* | 9/2016 | Heneghan | G16H 50/20 |
| 2017/0083755 | A1* | 3/2017 | Tang | G06K 9/00268 |
| 2018/0011533 | A9* | 1/2018 | Marggraff | G06F 3/013 |

OTHER PUBLICATIONS

International Search Report for Application No. PCT/EP2017/065265, dated Nov. 13, 2017.

Madhura Datta et al: "Two dimensional synthetic face generation and verification using set estimation technique", Computer Vision and Image Understanding, Academic Press, US, vol. 116, No. 9, May 16, 2012 (May 16, 2012), pp. 1022-1031, XP028400035.

Vlado Kitanovski et al: "Augmented reality mirror for virtual facial alterations", Image Processing (ICIP), 2011 18th IEEE International Conference On, IEEE, Sep. 11, 2011 (Sep. 11, 2011), pp. 1093-1096, XP032079768.

Stefano Melacci et al: "A template-based approach to automatic face enhancement", Pattern Analysis and Applications, Springer-Verlag, LO, vol. 13, No. 3, Apr. 8, 2009 (Apr. 8, 2009), pp. 289-300, XP019806522.

Morishima Shigeo et al: "Instant Movie 1-4,10 Casting with Personality: Dive into the Movie System", Network and Parallel Computing; [Lecture Notes in Computer Science; Lect.Notes Computer], Springer International Publishing, Cham, vol. 6774 Chap.21, No. 558, Jul. 9, 2011 (Jul. 9, 2011), pp. 187-196, XP047370104.

* cited by examiner

METHOD AND DEVICE FOR MODIFYING THE AFFECTIVE VISUAL INFORMATION IN THE FIELD OF VISION OF AN USER

BACKGROUND OF THE INVENTION

Field of the Invention

The invention relates to a method and a device for changing the affective visual information in the field of vision, in particular in the field of view, of a user. The device has at least one image sensor and at least one display as well as a processing unit that is connected to the image sensor and the display, the image sensor being set up to acquire an image of a visual field of the device, the display being set up to superimpose the field of vision of a user in a superimposition region of the display with alternative image data.

Description of the Related Art

Here, the field of vision of the user is that solid angle or region of external space from which at least one eye of the user can receive and evaluate light pulses. It is composed of the monocular fields of vision of the two eyes. In comparison, the field of view here is that region that contains in the external space all visual objects that can be centrally fixed in succession with the eyes with the head and body held at rest; this region is also more precisely called the monocular field of view. The visual field finally designates the region in the angle of view of an optical instrument or an optical device, i.e., the region of external space that can be viewed by the device (with one eye) or that can be imaged (for example, with an image sensor).

Devices and methods are known with which insertion of additional information, i.e., which goes beyond the reproduction of the vicinity, in the field of vision of a user is possible. These devices and methods are combined under the term "Augmented Reality" (AR). For example, US 2011/0214082 A1 shows such a device in the manner of a head-mounted viewing device with transparent display that can be called "AR glasses" for short. This device comprises a camera for acquiring images of the vicinity, in particular a visual field of the device. These images can be processed, and the results of the processing can be used for choosing the inserted information. These AR devices are generally designed to supply the user with information that augments the information that can be directly optically perceived in the vicinity ("to augment" means to amplify, to expand) and differs from it.

In another technical connection, in video conferencing systems, changing the information that can be directly optically perceived by the user by cross-fading of certain image regions is known. U.S. Pat. No. 9,060,095 B2 describes a method in which the face of a participant in a video conference is replaced by a replacement image, for example a schematic face or a foreign face. Thus, the objective is to hide the identity of the participant from the other participants of the video conference. The cross-faded face of the pertinent participant cannot be viewed or recognized by the other participants. This protection of the identity is, of course, not transferable to AR applications, because a wearer of an AR device as described above can take it off in order to see the actual face of his interlocutor. Accordingly, it would contradict the purpose of the method to intend to use it for individuals in the vicinity of a wearer of an AR device.

BRIEF SUMMARY OF THE INVENTION

One object of the invention is to propose a method and a device with which the affective perception of a user can be adapted when viewing his vicinity.

The method according to the invention for changing the affective visual information in the field of vision, in particular the field of view, of a user of a device with at least one image sensor and at least one display comprises the following steps: acquisition of an image of a visual field of the device with the image sensor, facial recognition with the acquired image for recognizing at least one face, determining the positions of eyes and mouth of the recognized face, computing a superimposition region in the display of the device depending on the determined positions of eyes and mouth, and superimposition of the field of vision of a user of the device in the computed superimposition region of the display with alternative image data. The visual field of the device is generally an extract from the field of vision of the user. It does not necessarily correspond to the region imaged by the image sensor; in particular, the imaged region can comprise the visual field of the device and can go beyond it. The image sensor can be, for example, part of a visual field camera that has a larger visual field than the device. The device can be, for example, glasses, a camera, binoculars, a sight, or another optical device. The image sensor and the display are part of the same device and preferably have a fixed relative arrangement. In facial recognition, the number and the positions of faces in the image acquired with the image sensor are recognized. This facial recognition can proceed with conventional means and algorithms. When computing the superimposition region, essentially the position and dimensions of the superimposition region in the display are computed. The superimposition of the field of vision or field of view of the user is achieved in particular by insertion into a visual field of the device with the display.

The device of the initially-cited type according to the invention for changing the affective visual information in the field of vision, in particular in the field of view, of a user is characterized in that the processing unit is set up to carry out facial recognition with an image acquired by an image sensor, to determine positions of eyes and mouth of a face recognized in the facial recognition, and to compute a superimposition region in the display for superimposing the field of vision depending on the determined positions of eyes and mouth. The device is preferably an AR device. The content of the display is controlled using data that has been acquired by the image sensor, the display and image sensor being located essentially at the same site, specifically as part of the same device.

By superimposing the field of vision of the user in a superimposition region that is dependent on the positions of the eyes and mouth of recognized faces, specific superimposition of these faces can be achieved, which can be used for regulation of the visual perception of affects on individuals in the field of vision or field of view of the user.

It has been ascertained that this regulation of the visual perception of affects has a major influence on the capacity for empathy of the individuals supported in this way. For example, in individuals with ADHD, a positive effect of this regulation on self-confidence and on good self-effectiveness has been ascertained. Moreover, stress reaction in social interaction can be controlled and attenuated.

Affective information in this connection is all signals that express an emotion of an individual. Depending on the psychological state of the individual, this information comprises gradual expressions of actual emotions and expressions for hiding actual emotions ("affective facade") or in the absence of specific emotions, expressions of cognitively-generated emotions that are rated as expected or useful. In the same manner as the intensity of expression, the intensity of perception for affective information is individually different and dependent on the psychological state and also genetically disposed.

The superimposition of the field of vision preferably comprises a representation of the alternative image data in the superimposition region of the display.

Accordingly, the display can be a screen or a display, in particular a transparent display.

Preferably, the change in the affective visual information corresponds to a gradual diminishment or intensification of the affective visual information. That is, the affective visual information is preferably not completely erased or overwritten. The gradual diminishment or intensification can be achieved by, for example, local gradual change in the transparency of a display. For example, the transparency can be reduced in one superimposition region to a suitable percentage, for example to 50%.

Accordingly, this method is preferably a method for in particular gradual reduction/diminishment/disruption or intensification/enhancement of the affective visual information in the field of vision of a user of this device.

Advantageously, there can be a fluid transition at the boundary or edge of the superimposition region. For example, a gradual course of the edge can be achieved by means of linear variation of the transparency. In doing so, the transparency in a transition region of the superimposition region on the boundary of the superimposition region in the direction perpendicular to the boundary of the superimposition region can increase from within the superimposition region to outside of the superimposition region. The transition region corresponds essentially to a strip along the boundary of the superimposition region. The width of the transition region is preferably matched to the width of the superimposition region; it is, for example, between 5 and 30% of the width of the superimposition region, preferably between 15 and 25%. The variation of the transparency is preferably linear over the width of the transition region and varies preferably between complete transparency (or maximum transparency of the display used) on the boundary of the superimposition region and the selected transparency outside of the transition region (i.e., in the remainder of the superimposition region), for example complete opacity (or minimum transparency of the display). The fluid transition achieved by the transition region reduces any irritation of the user caused by the superimposition.

Preferably, the device has two image sensors that are located at a fixed distance from one another. This enables the determination of the distance to a recognized face, as a result of which more accurate computation of the dimensions of the superimposition region in the display is enabled.

Especially preferably, the device comprises augmented reality glasses. Suitable glasses are offered by, for example, Osterhout Design Group, 153 Townsend Street, Suite 570 San Francisco, Calif. 94107, in particular its products "R-6" or "R-7 Smartglasses System."

The superimposition region can correspond essentially to a triangle spread out between the positions of the two eyes and the mouth. That is, the computation of the superimposition region comprises a connection of the positions and determination of the image points of the display that are located in the encompassed triangle(s). Alternatively, other geometrical shapes can also be used whose size is scaled according to the indicated triangle. For example, a symmetrical trapezoid can be used in which the wider base side is located in the region of the eye positions. Optionally, the wider base side can be lengthened to the top by a rectangle. It has been ascertained that in the region of the eye-eye-mouth triangle, the largest affective amount of data is transported, in particular by the mimetic musculature. A comparatively smaller part of the affective information is imparted in conventional interpersonal interaction by the voice and body language. Superimposition of information in this region of the field of vision therefore results in a reduction of the affective information that has been perceived by the user; this can be used for regulation. Thus, the affective information perceived by users with unusually strong affective perception can be reduced to a level that corresponds to average effective perception.

On the other hand, the superimposition region can also comprise essentially the entire field of view outside of a triangle spread out between the positions of the two eyes and the mouth. That is, in this case, the computation of the superimposition region comprises a connection of the positions and determination of the image points of the display that are located outside of the encompassed triangle or triangles. A superimposition of the region outside of the so-called eye-eye-mouth triangles enables emphasis of the eye-eye-mouth triangle and a deflection of attention to these triangles, for example by dimming the remaining superimposed region. The superimposition then results in an amplification of the affective information that has been perceived by the user. Thus, the affective information perceived by users with unusually weak affective perception can be raised to a level that corresponds to average affective perception.

The processing unit of the device in question can preferably have facial recognition software. By means of the facial recognition software, on the one hand, faces can be recognized in the acquired image data, and the positions of eyes and mouth of the individual recognized faces can be determined.

Alternative image data can preferably correspond to altered imaging of the visual field of the device in the superimposition region, the change in the imaging encompassing a change in brightness, a reduction in image resolution, a change in delineation (also called sharpness) and/or in contrast, color marking (for example, by means of a frame and/or color tinting), and/or manipulation of facial traits. The indicated changes in imaging contain a part of the original information in the superimposition region. That is, not all optical information in the superimposition region is replaced. In this way, the superimposition is less conspicuous to the user, so that his attention is not unintentionally diverted to the superimposition region. One such diversion that appears unintentional for the vicinity could, of course, have an unnatural and irritating effect on a party other than the user; this can be avoided with the proposed changes. Essentially skin-colored tinting in the superimposition region has proven particularly favorable. Especially minor irritation of the perception with, moreover, effective disruption of affective visual information can be achieved with a partially transparent, preferably horizontal, strip pattern in the superimposition region. The number of strips within a recognized facial region is preferably greater than four and less than 50. The color of the strip pattern can vary between the color of the recognized facial folds (dark) and relatively flat facial surfaces (bright) and thus can be matched to the face recognized at any one time.

Furthermore, within the scope of this method, it is advantageous to provide for acquisition of the signal of at least one biofeedback sensor, the superimposition being activated as a function of the signal of the biofeedback sensor. Preferably, superimposition can be activated only at a stress level that has been determined by the biofeedback sensor above a predefined threshold so that below the threshold, an unchanged perception of the vicinity is possible. The superimposition is activated here preferably only for a fixed short time interval, after whose expiration the unchanged visual field can be perceived again. The biofeedback sensor can be in particular a stress sensor, for example a photoplethysmogram (PPG) or a sensor for measuring skin resistance, skin temperature, heart rate and/or the motion of the body. One such biofeedback sensor is, for example, the product "Q sensor" from the company Affectiva, 465 Waverley Oaks Road, Suite 320, Waltham, Mass. 02452, United States, or the products "Embrace" and "E4" from the company Empatica Inc, 1 Broadway, 14th floor, Cambridge, Mass. 02142, United States.

Accordingly, the device in question can comprise a biofeedback sensor, the processing unit being set up and connected to the biofeedback sensor to activate the superimposition depending on a signal of the biofeedback sensor.

In conjunction with the evaluation of a signal of a biofeedback sensor, it is especially advantageous if the extent of the change in the imaging is determined as a function of the signal of the stress sensor. For example, in this way, with an increasing stress level, stronger dimming of the affective information can be undertaken and vice versa. In this way, negative circulation, in which the perception of the other party of increased stress on the user contributes to affective information that further increases the stress, can be broken through early. Moreover, the change in the imaging can be limited to those situations in which it is necessary or helpful (for example under stress or worry). Outside of these situations, the change in the affective information is minimized so that a natural mutual perception is achieved.

Likewise, in conjunction with the acquisition of the signal of at least one biofeedback sensor, within the scope of this method, the alternative image data can correspond to a reference recording of the superimposed facial region. The reference recording can be stored at a fixed low or normal stress level. Thus, the reference recording shows, for example, a facial expression with little visual affective information and/or with positive or calming visual affective information. As soon as a high stress level has been ascertained, the reference recording is used for superimposition of the same face. For scaling and alignment of the reference recording, the eye-eye-mouth triangle that has been recognized both in the reference recording and also in the superimposition region is used. By the superimposition, for example, of one facial region with a reference recording of the same facial region, an especially natural image and consequently especially low irritation of the user can be achieved.

In the case of devices in which depending on the eye position of the user when using the device depends on the position of the eyes [sic], it is advantageous if this method, before computing the superimposition region, calls for calibration of the display of the device for a user, an eye distance and a distance between the eyes and the display being determined, the ascertained eye distance and the ascertained distance when computing a superimposition region being taken into account in the display. By calibration, the superimposition region can be more accurately computed, so that controlled superimposition of certain precisely delineated regions in the visual field of the device is enabled. Without calibration, conversely the error of estimation of the eye distance and the distance to the display must be considered, for which reason a comparatively larger superimposition region must be computed in order to reliably achieve the desired superimposition.

It has furthermore turned out to be advantageous within the scope of the method in question to provide for triggering an optional user notification when a coupled biofeedback sensor, in particular a coupled stress sensor, is activated (for example, by means of measurement of pulse frequency, muscle tone, EEG measurement and/or skin conduction rate), i.e., when a signal of a coupled biofeedback sensor exceeds a predefined threshold, and/or when the facial recognition (for example in the form of facial recognition software) detects an affective deflection or resonance above a predefined threshold on a recognized face (i.e., on the individual opposite) and/or when voice recognition recognizes a voice of an individual that has been stored beforehand as a stressor in a database. One such user notice or notification can be achieved with a haptic signal (for example, vibration), an acoustic signal (for example, alarm) or optical signal (for example, blinking display), which are delivered from a pulse generator.

Correspondingly, the device in question can preferably comprise a notification apparatus that is set up to deliver an optical, acoustic or haptic signal, the processing unit being set up and connected to the notification apparatus to trigger an optical, acoustic or haptic signal when a specific affective pattern and/or an individual assigned to a specific affect is recognized. Here, a specific affective pattern is defined both as an affective reaction of the user of the device that can be ascertained, for example, by means of a biofeedback sensor, and also an affective reaction of the other party, i.e., on at least one recognized face that can be ascertained, for example, within the scope of facial recognition using the facial expression. An individual assigned to a specific affect can be ascertained, for example, within the scope of additional voice recognition in conjunction with a database of individuals stored beforehand as a stressor or their voice characteristics.

The notification enables a user with little affective perception strength to realize the affective information transported by another party or to consciously perceive and react to it accordingly. When using the device or the method over a longer time interval, the attentiveness to affective information is trained by the notifications, and, in this way, the natural capability for empathy of the user is enhanced.

Preferably, the superimposition can be activated as a function of the aforementioned voice recognition, the superimposition only being activated when the voice of an individual filed in a database (of stressors) that is designed for this purpose is recognized.

In another preferred embodiment, the superimposition can be activated as a function of the identification of a recognized face, the superimposition only being activated when the face of an individual filed in a database (of stressors) that is designed for this purpose is recognized and identified.

Preferably, within the scope of the invention, at least three operating modes can be selected by the user:
1) a permanently activated superimposition, i.e., of each recognized face;
2) an individual-specific superimposition, the superimposition being activated as a function of a voice recognition and/or facial recognition;
3) activation of the superimposition by means of a biofeedback sensor (or stress sensor), i.e., the superimposition being activated as a function of the stress level of the user.

In addition to the above-described applications, the invention also relates to a method for measuring the sensitivity of a subject for affective visual information, in particular for sole or supplementary diagnostics of anxiety conditions and depressions in general and especially diagnostics of ADHD or diseases from the autistic spectrum. This method comprises the above-described method for changing affective visual information, the subject being the user of the device according to the invention and the superimposition being varied over time (for example, deactivated in alternation for a few minutes, then activated for a few minutes), and at the same time the affective reaction of the subject being determined with a stress sensor. A measure of the sensitivity for affective visual information or at least insensitivity can be ascertained from the time correlation between the time characteristic of a stress level measured using the stress sensor and the time characteristic of the superimposition.

Moreover, the invention relates to the use of a method or a device of the initially-cited type with the above-described preferred embodiments for preventing social stress situations, for precluding anxiety conditions and depressions, or for stress reduction among a portion of depressive and anxious individuals. Depending on the variance of affect perception, in depressive conditions as well as in anxiety conditions, in the respective causality, (a) an affect-dependent form and (b) a form that is hardly affect-dependent to not affect-dependent can be found in the origination of these conditions. In the case of (a), a strong perception of the affects in the face of a viewed individual, such as, for example, in ADHD (ICD-10 Code F90.-), corresponds to the ideal type, and in the case of (b), a slight to deficient perception in this region, such as in, for example, autism (Icd-10 Code F84.-), corresponds to the ideal type. Concordant with the previous tests in the ordination of the inventor, the "Lazar Effect," therefore, a stress reduction, can be ascertained by influencing the affect perception (in the sense of a reduction of the information content in the corresponding visual region), for a portion of depressive and anxious patients (ICD-10 Code F3-.- and F4-.-), as well as for all ADHD patients. For these groups of individuals, the use of this invention is therefore particularly advantageous. This, while another portion of depressive and anxious patients does not experience any stress reduction at all, this exclusively for affected individuals with little to no automated affect perception relative to other individuals [sic]. In two patients with conditions from the autistic spectrum, both suffer from Asperger's syndrome; likewise, no stress reduction at all could be ascertained in the use of this invention. This corresponds exactly to the hypothesis regarding the expected Lazar effect and its meaning for the patient group described under (a). Since the perception capacity of healthy individuals can likewise be divided into two groups corresponding to the ideal type in each case, and it can occur as a result of misunderstanding with respect to the semantics of emotional perception or affect perception because most individuals assume that the other party has the same affect perception, these two terms are defined still more precisely below: The group corresponding to (a) here means at the same time affect-dependent, the automated perception of affects (in particular of muscle contractions in the face) that is independent of intellectual control and consciousness in the case of viewed individuals. This processing process is not present in group (b) and in individuals from the healthy range that correspond to this ideal type. It is therefore in most cases not understood by the latter for lack of their own structural conditions. The latter is based on a mechanism of perception of other individuals among psychiatric laymen, often also called general human knowledge. This is based on the false assumption that other individuals function and perceive according to the same principles. The group corresponding to (b) perceives affects solely via a deliberate and therefore conscious act that immediately stops when attention is withdrawn from the viewed individual. This is comparable to the understanding of a non-native language that is only understood when attention is focused on it. The affect-dependent perception conversely means the constant perception of the affects of the other party, corresponding to automatic hearing and understanding of the native language.

BRIEF DESCRIPTION OF THE DRAWINGS

The invention is explained still further below using an especially preferred exemplary embodiment to which, however, it is not to be limited with reference to the drawings. Here, in detail.

DETAILED DESCRIPTION OF THE PREFERRED EMBODIMENTS

Figure 1:
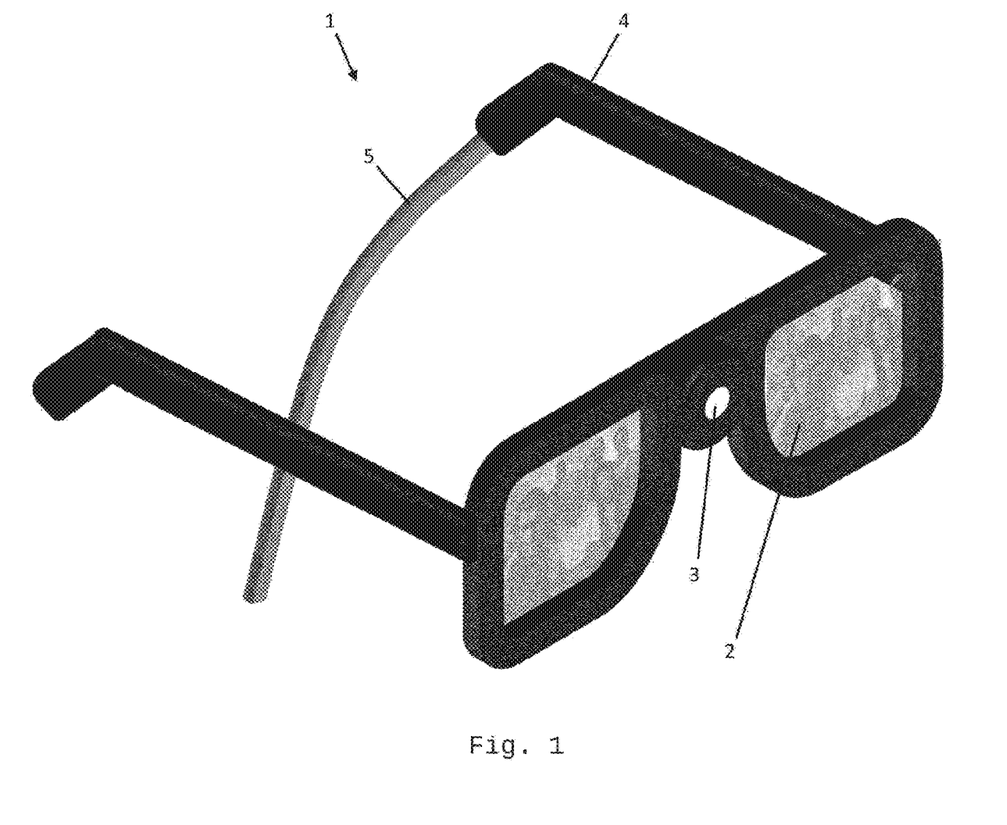
FIG. 1 schematically shows a part of a device according to the invention in the form of AR glasses.

FIG. 1 shows a simplified representation of AR glasses 1, such as, for example, the "R7 Smart Glasses" offered by the Osterhout Design Group (ODG). The lenses of the AR glasses 1 are two displays 2, which are each made as a transparent display (look-through display). The graphic surface displayed on these displays is generated by a processing unit (not shown), which is operated with the operating system (OS) Android with the OS expansion "ReticleOS" (likewise from ODG).

A camera 3 integrated into the AR glasses 1 comprises an image sensor and delivers an image of the vicinity. The visual field of the camera 3 covers essentially the half-space in front of the lenses of the glasses and is thus larger than the visual field of the AR glasses 1. The visual field of the AR glasses 1 corresponds to that part of the field of vision of a user that is being perceived by the lenses of the glasses. The image of the vicinity that has been acquired by the camera 3 is transmitted via a cable in the frame 4 of the glasses and a connecting line 5 to a processing unit 6 (see FIG. 2) and is continuously analyzed there by facial recognition software, which outputs the coordinates of the face or faces in the vicinity.

Figure 2:
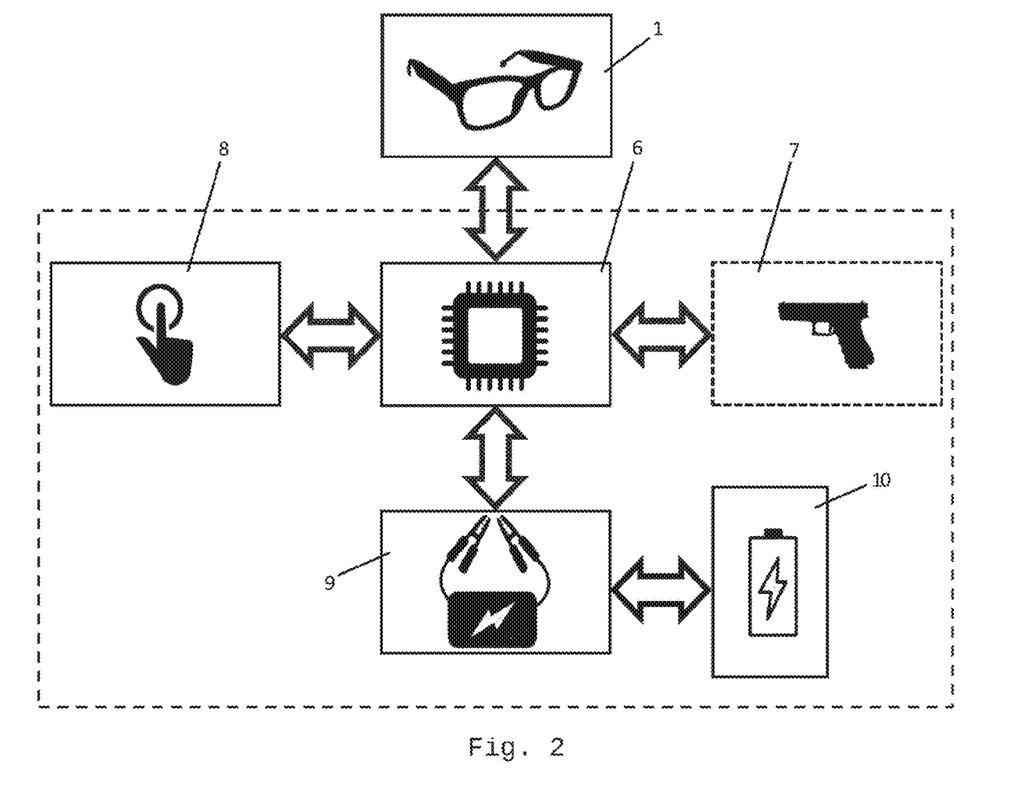
FIG. 2 schematically shows a block diagram of the functional elements of a device according to the invention.

An application program that runs on the processing unit 6 first determines from the pre-calibrated eye distance the region of the recognized face. Then, from the coordinates and the parameters established within the scope of calibration on the physiognomy of the individual wearing the glasses (eye distance, distance between lenses of the glasses and eye) for each lens of the glasses, it continuously computes the coordinates of the point of intersection of the viewing axis to the face of the other party with the lenses of the glasses, therefore that site in each lens of the glasses that is suitable to cover the eye-eye-mouth triangle (AAM triangle) of the other party. These data are in turn transferred to the API (programming interface) of the ReticleOS that inserts a preestablished image or pattern at the corresponding site in the lenses of the glasses.

The structure of the application program allows the merging of software expansions. They include, for example, expansions for continuous changing of the pattern or image used for cross-fading. The application program can thus be expanded, for example, to the extent that the inserted image is the face that has been photographed with the camera, recognized and output by the facial recognition software, and in which the facial features have been manipulated in a dedicated manner.

As shown in FIG. 2, the processing unit 6 can be optionally connected to sensors 7 and input elements 8. The sensors 7 can comprise a biofeedback sensor for measuring stress parameters. The measured parameters can be used to evaluate the data of the facial recognition software and assign them to a quality. For this purpose, for example, measurements of skin resistance, skin temperature, heart rate, or the movement of the body can be used as stress parameters.

The processing unit 6 together with the AR glasses 1 forms a device according to the invention. The latter is, moreover, connected to a power management unit 9 and a rechargeable battery 10.

The superimposition of the field of vision by means of the AR glasses 1 can be used fundamentally for two types of influence: First, a reduction of the affective information content by a generic change in the image data (brightness, contrast, portrayal, etc.) or, second, a superimposition of the face with another face or a face of the same individual with a modified affective information content, in particular smaller negative emotional content than the original image. The latter can be photographed prior to that by the camera 3.

The degree of acceptable influence on communication is limited by the communicative plausibility and is defined as given adequacy based on the psychiatric classification of the psychopathological status.

When this value is exceeded, a rapid rise of the affective information transported by the observed other party takes place, and as a result, by his perception for the user/individual wearing the glasses, a strong deflection of the stress sensors for the latter takes place. Moreover, the latter leads to a switching-over of the emotional perception from unintentional to intentional perception and to a reduction in adequacy.

It is one objective of this invention to control communication unintentionally and slowly in the direction of positive expression and perception of emotions among the interlocutors without reaching or exceeding the threshold value of adequacy.

Figure 3:
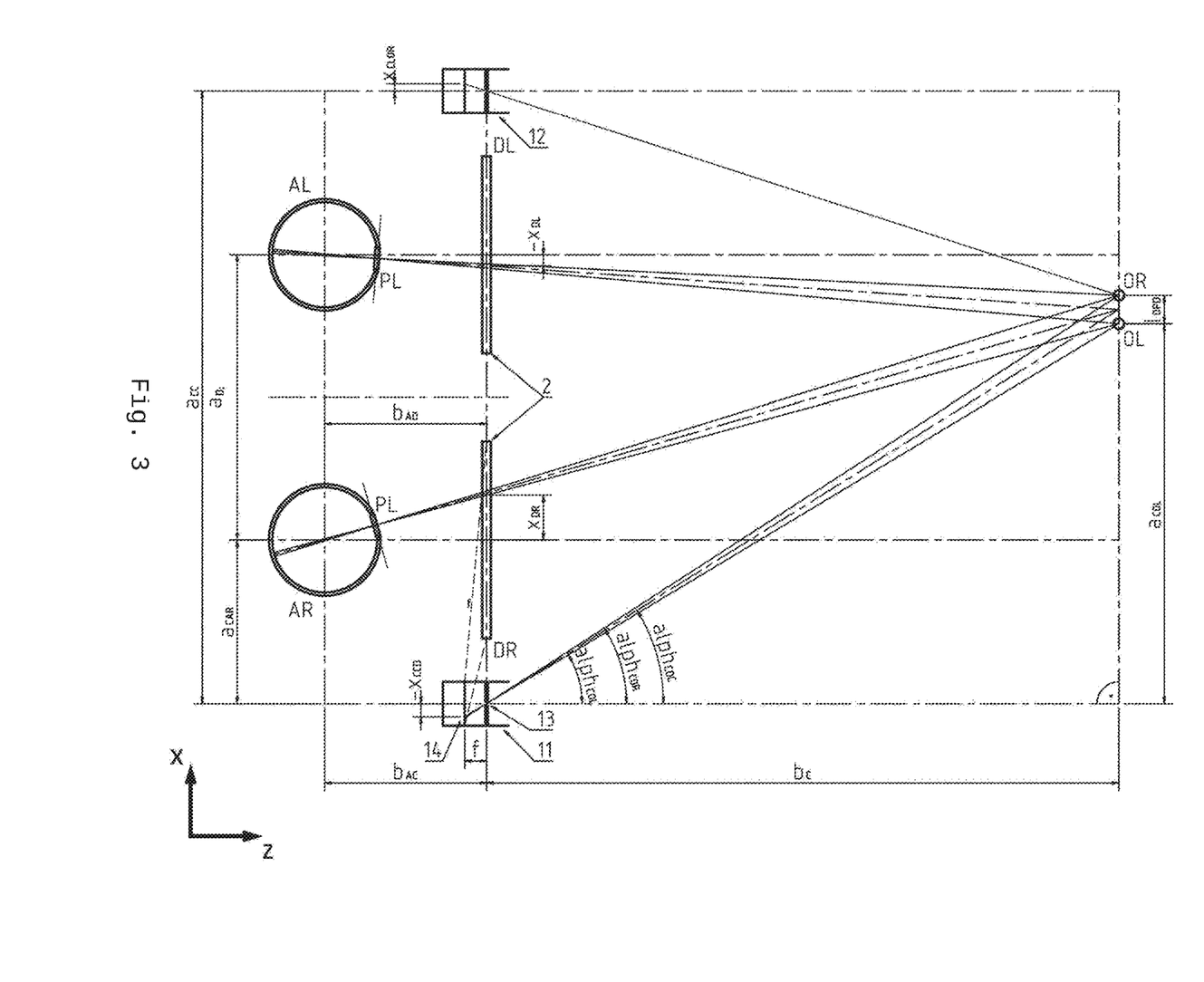
FIG. 3 schematically shows an illustration of the computation of a superimposition region.

FIG. 3 illustrates the method steps for computing the superimposition region using AR glasses 1 according to FIG. 1.

In the illustrated exemplary situation, the eyes AL (left eye) and AR (right eye) of an observing subject (the user and wearer of the AR glasses) are schematically shown. The eyes AL, AR are shown respectively by the opening of the pupil and the round eyeball with the retina on its posterior inner side. The coordinates of the points AL and AR correspond to those of the center of the respective eye. The centers of the pupils are marked with PL and PR for the pupil of the left and right eye respectively. The distance $a_{PD}$ corresponds to the measured pupil distance and stands for the distance between the centers of the two eyes AL, AR.

The subject wears AR glasses with two displays 2 as lenses of the glasses that are implemented as transparent displays. DL designates the lens of the glasses or display that is the left one from the subject's viewpoint and DR the right one. The points DL and DR are defined as the center of the respective display 2. Mounted on the glasses are two cameras 11, 12, which are each shown as a camera obscura, consisting of a diaphragm 13 and a CCD image sensor 14. The point C (for camera) is defined in the center of the diaphragm.

The coordinates x and y relate to the coordinate system whose origin is at the center of the image sensor 14 or in the left or right display DL, DR. Here, x is the horizontal coordinate, and y is the vertical coordinate. The indices indicate which coordinate system it is. Thus, the coordinates $x_{DL}$, $y_{DL}$ relate to the coordinate system with the origin point DL in space, and the coordinates $x_{DR}$, $y_{DR}$ relate to the one with the origin point DR, i.e., the center of the left and right display 2. The coordinates $x_C$ and $y_C$ relate to that coordinate system whose origin is at the center of the image sensor 14. The displays 2 and the image sensor 14 of the camera 11 are parallel to the x-y plane in space. The z-coordinate that is perpendicular thereto corresponds to the direction of the camera. The image plane of FIG. 3 corresponds to the x-z plane in space.

The other party whose facial features are being read is called the object (O). The eyes of the face of the object facing the observer/subject (S) are designated OL for the left eye from the viewpoint of the subject and OR for the right eye. The mouth is designated OM, the center of the face OC. Distances in the X direction are labeled a, those in the Y direction d, and those in the Z direction b. This choice is based on the conventional side designations of the triangles computed below. The indices of these lengths indicate the end points of the pertinent line segments.

The drawing according to FIG. 3 represents the projection of the line segments in space onto the x-z plane. Let f be the distance of the diaphragm 13 to the image sensor 14, which is known by the knowledge of the camera used. At this point, let $b_c$ be the still unknown distance of the camera 11 to the object (O). The image on the image sensor 14 yields the distance of the image of the left eye OL of the object on the image sensor 14 to the central axis $x_{C,OL}$ as well as the distance of the image of the right eye OR of the object on the image sensor 14 to the central axis $x_{C,OR}$. The beam triangles to the right from (in front of) the diaphragm 13 to the object and to the left from (behind) the diaphragm 13 to the image sensor 14 are similar. Therefore, the following applies:

$$\frac{a_{C,OL}}{b_C} = \frac{x_{C,OL}}{f} = \tan(\alpha_{C,OL}) \quad (1)$$

as well as $$\frac{a_{C,OR}}{b_C} = \frac{x_{C,OL}}{f} = \tan(\alpha_{C,OL}) \quad (2)$$

At this point, the eye distance of the object $l_{O,PD}$ (or l for short) with an average value of 65 mm is assumed, and $$a_{C,OL} = a_{C,OC} - l/2$$

as well as $$a_{C,OR} = a_{C,OC} + l/2$$

This yields an equation system of two equations and two unknowns:

$$\frac{a_{C,OC} - \frac{l}{2}}{b_C} = \frac{x_{C,OL}}{f} \quad (3)$$

as well as $$\frac{a_{C,OC} + \frac{l}{2}}{b_C} = \frac{x_{C,OR}}{f} \quad (4)$$

From the latter, the distance of the camera to the object $b_c$ and the distance $a_{c,oc}$ of the center of the face OC of the object from the central axis of the camera 11 can be computed.

The center of the darkening of the display at this point follows from:

$$\frac{a_{C,OC} - a_{C,AR}}{b_C + b_{AC}} = \frac{x_{DR}}{b_{AD}} = \tan(\alpha_{AR,OC}) \quad (5)$$

and analogously for the left display:

$$\frac{a_{C,OC} - a_{C,AR} - a_{PD}}{b_C + b_{AC}} = \frac{x_{DL}}{b_{AD}} = \tan(\alpha_{AL,OC}) \quad (6)$$

Here, it has been assumed that the coordinate origin of the display is located on the same axis as the center of the eye. If this is not the case, the coordinates are to be shifted accordingly. In practice, it will be the reverse: In the calibration phase, the darkening point can be manually shifted. The center of the eye is then computed from $x_{DR}$, and the coordinate transformation is approximated iteratively from all manual interventions.

For the transformation of the y coordinate of the image sensor 14 onto the y coordinate of the display, let $d_{C,OA}$ be the projection of the line segment from the camera diaphragm to the eyes OR, OL of the other party/object onto the y-z plane and $d_{C,OM}$ the projection of the line segment from the diaphragm 13 to the mouth (OM) of the other party/object onto this plane, and let $y_{C,OA} = y_{C,OR} = y_{C,OL}$, and $y_{C,OM}$ be they coordinates of the image of these points on the image sensor 14 of the camera 11:

$$\frac{d_{C,OA}}{b_C} = \frac{y_{C,OA}}{f} = \tan(\alpha_{C,OA}) \quad (7)$$

as well as $$\frac{d_{C,OM}}{b_C} = \frac{y_{C,OM}}{f} = \tan(\alpha_{C,OM}) \quad (8)$$

Since $b_c$ is already known from equations (3) and (4), $d_{C,OM}$ and $d_{C,OA}$ can be computed from this equation system. Analogously to equation (5), at this point, the y coordinate on the two displays can be computed from the distances (determined in the calibration) between the camera and eye $d_{C,A}$ on the Y-Z plane:

$$\frac{d_{C,OA} - d_{C,A}}{b_C + b_{A,C}} = \frac{y_{D,A}}{b_{A,D}} = \tan(\alpha_{A,OA}) \quad (9)$$

as well as $$\frac{d_{C,OM} - d_{C,A}}{b_C + b_{A,C}} = \frac{y_{D,M}}{b_{A,D}} = \tan(\alpha_{A,OM}) \quad (10)$$

If the origin of the coordinates of the display is not at the height of the center of the eye, as assumed here, the coordinates must again be shifted accordingly.

In the transformation of the y coordinates, the corner points $y_{D,A}$, $y_{D,M}$ of the superimposition region and thus also its dimensions have already been determined. This can take place analogously in the transformation of the x-coordinates, which, however, has been omitted for reasons of clarity. In doing so, exactly as in the computation of the central point of the superimposition region, the eye center can be assumed, since the triangle (in the x-z plane) from the center of the eye to OL and OR completely superimposes the triangle from the pupil to the OL.

In the computation of the extension of the superimposition region, moreover, that error that results from the different magnitudes of the eye distance $l_{O,PD}$ of the other party/object can be taken into account, i.e., the error of the assumed average value of 65 mm. An error computation then yields the necessary increase of the extension of the superimposition region.

When using the second camera 12, two angles yield the acquired reference point at the object. Since the distance $a_{CC}$ between the two cameras is known, the triangle between the first camera 11, the second camera 12, and the object or its eyes OR, OL can be constructed using the WSW law or using the law of sines. The distance $b_C$ of the cameras 11, 12 to the object then corresponds to the height of the triangle. Thus, the estimation of the eye distance of the object is no longer relied upon, and the aforementioned miscalculation and the resulting enlargement of the superimposition region can be omitted.

For example, using the following equation:

$$\frac{a_{CC} - a_{COC} - \frac{l}{2}}{b_C} = \frac{x_{CLOR}}{f} \quad (11)$$

the system of equations (3) and (4) can be solved even without knowledge of the eye distance $l_{O,PD}$.

Figure 4:
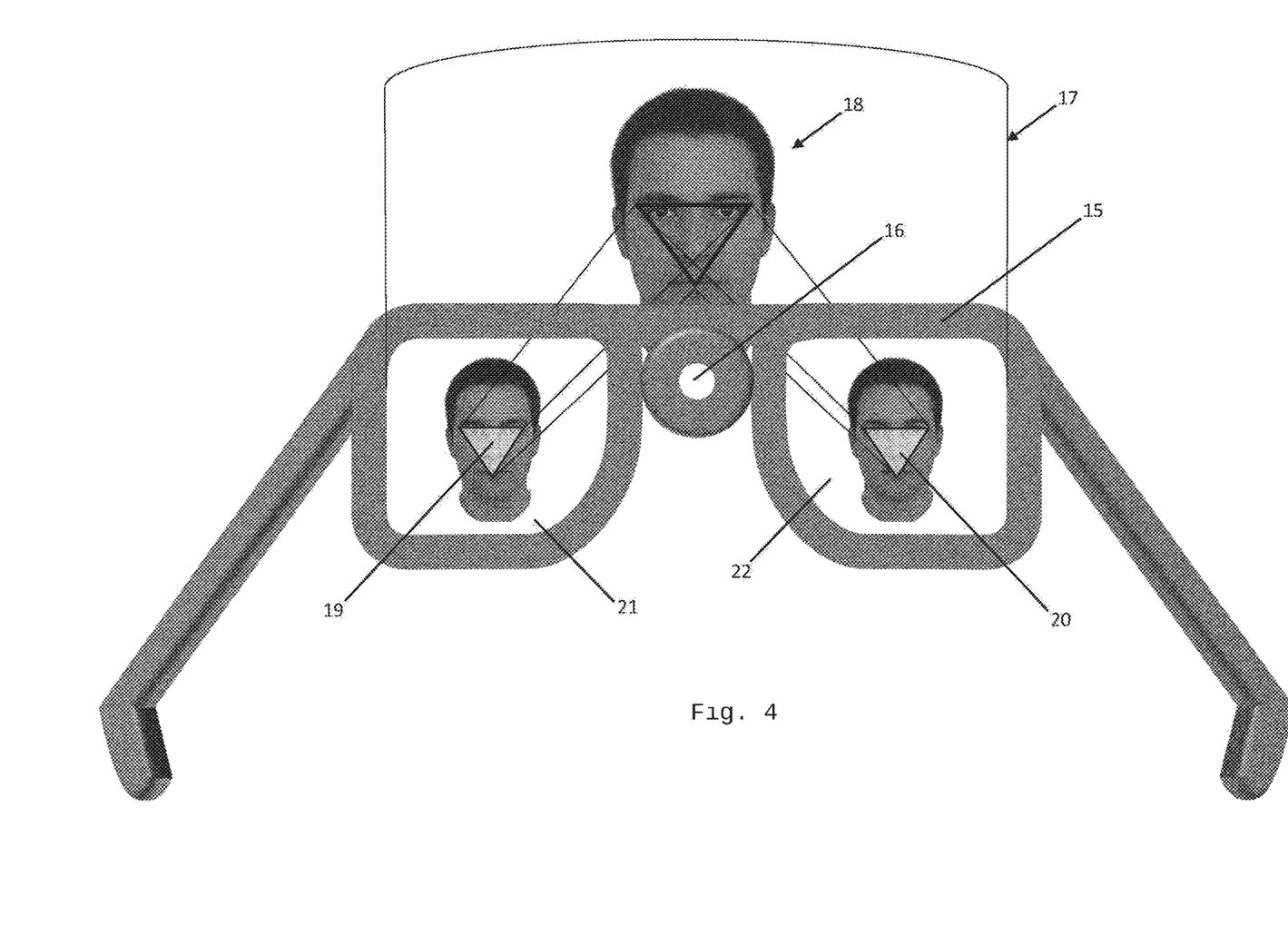
FIG. 4 shows one application example of the method according to the invention.

FIG. 4 schematically shows one application example of the method according to the invention using exemplary AR glasses 15. A field of view camera 16 on the front of the AR glasses 15 acquires an image of the visual field 17 of the AR glasses 15 with an integrated image sensor. An integrated processing unit carries out facial recognition with the acquired image for recognizing at least one face 18. In doing so, the position of the eyes and mouth of the recognized face 18 is determined, and then superimposition regions 19, 20 in the displays 21, 22 of the AR glasses 15 are computed depending on the determined positions of the eyes and mouth (compare FIG. 3 and the description above in this respect). Finally, the field of vision of a user of the device is superimposed in the computed superimposition regions 19, 20 of the displays 21, 22 with alternative image data. The alternative image data are in each case partially transparent black surfaces that thus achieve local darkening of the field of vision in the superimposition regions 19, 20 and in this way reduce the perceptible affective information of the face 18. Alternatively, the alternative image data can be formed by in each case partially transparent skin-colored surfaces; this has a less irritating effect than black surfaces. Outside of the superimposition regions 19, 20, the displays 21, 22 are uniformly, preferably completely, transparent comparable to a conventional optical glasses or sunglasses. The face 18 is drawn on the displays 21, 22 only for better understanding of the arrangement of the superimposition regions 19, 20, and thus represents the perspective of the user of the AR glasses 15, i.e., who is looking through the displays 21, 22.

Figure 5:
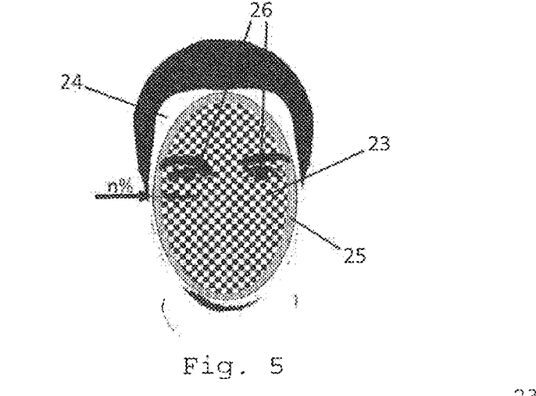
FIG. 5 schematically shows an elliptical superimposition region with a transition region with transparency that rises linearly to the outside.

FIG. 5 schematically shows a view through one of the displays 21, 22 with an elliptical superimposition region 23 for superimposition of a face 24. The superimposition region 23 encompasses a transition region 25 with transparency that increases linearly to the outside. Outside of the transition region 25, the transparency of the superimposition region 23 is essentially constant. The width of the transition region 25 corresponds to roughly 10% of the width of the superimposition region 23 at the widest point, measured parallel to a connecting line between the recognized eyes 26 of the face 24. The transition region 25 yields a fluid transition between the superimposition region 23 and its vicinity, which has a less irritating effect for a user than a hard edge on the boundary of the superimposition region 23.

Figure 6A:
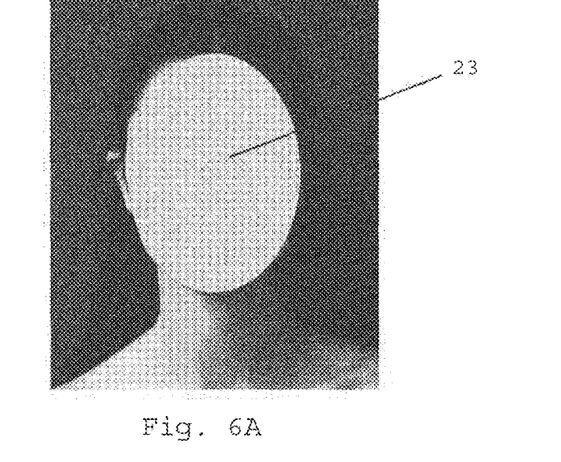
FIGS. 6A, 6B, 6C and 6D show four application examples for an elliptical superimposition region with a transition region with transparency that rises linearly to the outside for respectively different widths of the transition region.
Figure 6B:
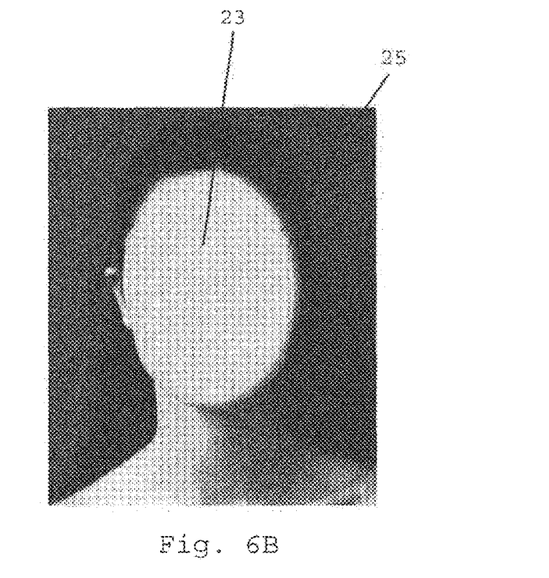
Figure 6C:
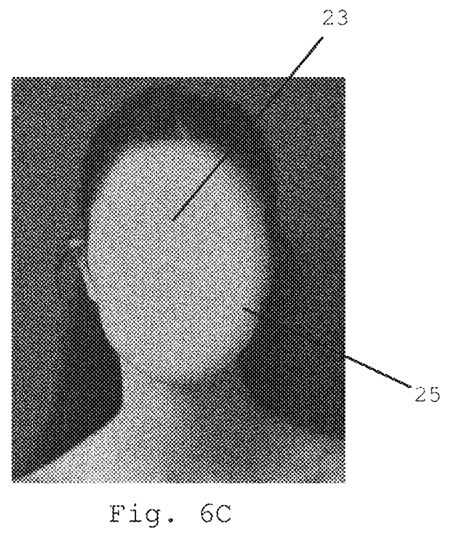
Figure 6D:
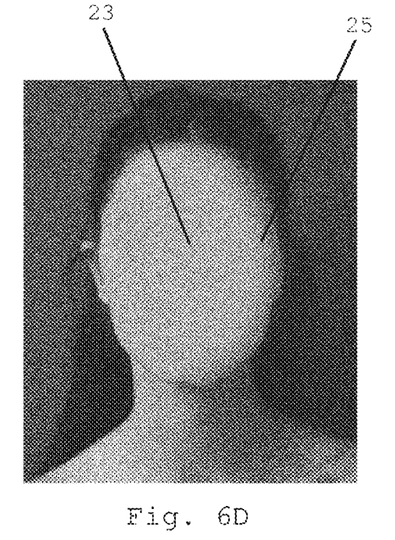

FIGS. 6A, 6B, 6C and 6D show four application examples for the transition region that is described in conjunction with FIG. 5. Here, in each case, a face with an elliptical, skin-colored superimposition region 23 is shown. The superimposition region 23 covers essentially the entire facial region between the ears and from the chin to the hairline. FIG. 6A shows the superimposition region 23 without the transition region 25; this corresponds to a width of the transition region 25 of zero. FIGS. 6B, 6C and 6D show the superimposition region 23 with a transition region 25 according to FIG. 5. The width of the transition region 25 in FIG. 6B is 10% of the width of the superimposition region 23; in FIG. 6C, it is 20% of the width of the superimposition region 23; and in FIG. 6D, it is 30% of the width of the superimposition region 23. In FIGS. 6C and 6D, the eyebrows of the face can be recognized. In FIG. 6D, the external eye angles, the upper forehead region, and the mouth angle of the face can also be recognized. The width of the transition region can be used accordingly for adjusting the recognizable visual affective information.

Figure 7:
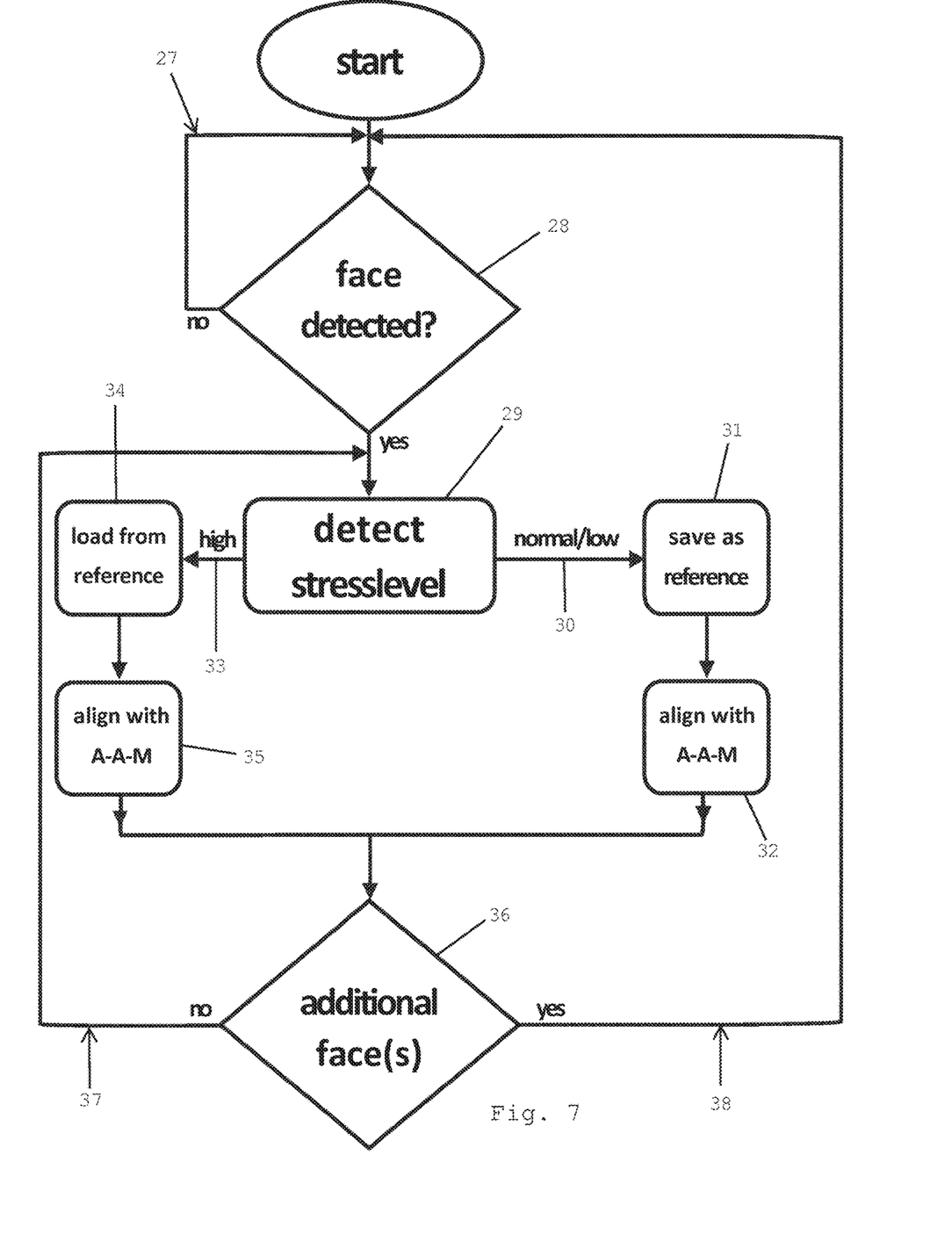
FIG. 7 schematically shows a flow chart of a method for using a reference recording for superimposition of a facial region.

FIG. 7 shows a simplified flow chart of a method for use of a reference recording for superimposition of a facial region according to one exemplary embodiment of this method. Here, first of all in a loop 27, it is maintained until facial recognition 28 recognizes a face in the image data that have been acquired by the image sensor 14. As soon as a face has been recognized, a stress level is determined (determination 29) by means of a stress sensor (for example, a biofeedback sensor). If the stress level is average or low (path 30), the image data in one region of the recognized face are stored as a reference recording (storage 31). Together with the reference recording, the positions of the corner points of the eye-eye-mouth triangle in the reference recording are determined and stored (determination and storage 32) in order to accelerate later scaling and alignment of the reference recording. If the stress level is still high (path 33), a current reference recording is loaded (loading 34), which corresponds to the recognized face. The assignment of the suitable reference recording takes place via biometrics features of the acquired faces in a way that is known in the art. After loading 34, the reference recording is matched to the size, alignment and position of the recognized face by scaling, rotation and shifting and is then inserted as alternative image data into the displays 21, 22 (adaptation and insertion 35). Subsequently, it is checked whether other faces have been recognized (checking 36). If no, the stress level is determined again, and the use of the superimposition is re-evaluated, and optionally the adaptation is updated (loop 37). If yes, the method is repeated proceeding from the facial recognition 28 for the next face (loop 38).

The invention claimed is:

1. A method for changing affective visual information in a field of vision of a user of a device with at least one image sensor and at least one display, the method comprising:
    acquiring an image of a visual field of the device with the image sensor;
    facially recognizing at least one face using the acquired image;
    determining positions of eyes and mouth of the recognized face;
    computing a superimposition region in the display of the device depending on the determined positions of the eyes and the mouth, the superimposition region encompassing essentially the entire field of view outside of a triangle spread out between the positions of the two eyes and the mouth; and
    superimposing the field of vision of the user of the device in the computed superimposition region of the display with alternative image data corresponding to altered imaging of the visual field of the device in the superimposition region, the altered imaging encompassing one or more of a change in brightness, a reduction in image resolution, a change in one or more of delineation and in contrast, and one or more of color marking and manipulation of facial traits.

2. The method according to claim 1, wherein the superimposing comprises representing the alternative image data in the superimposition region of the display.

3. The method according to claim 1, further comprising acquisition of the signal of a least one biofeedback sensor, the superimposition being activated depending on the signal of the biofeedback sensor.

4. The method according to claim 3, wherein an extent of the change in the imaging is determined depending on the signal of the biofeedback sensor.

5. The method according to claim 1, further comprising, before computing the superimposition region, calibrating the display of the device for the user, an eye distance and a distance between the eyes and the display being determined, the determined eye distance and the determined distance between the eyes and the display when computing the superimposition region being taken into account in the display.

6. The method according to claim 1, further comprising triggering a user notification when one or more of
- a signal of a coupled biofeedback sensor exceeds a predefined threshold,
- the facial recognition detects an affective deflection or resonance above a predefined threshold on a recognized face, and
- voice recognition recognizes a voice of an individual that has been stored beforehand as a stressor in a database.

7. A device for changing an affective visual information in a field of vision of a user, the device comprising:
- at least one image sensor configured to acquire an image of a visual field of the device;
- a display configured to superimpose the field of vision of a user in a superimposition region of the display with alternative image data;
- a processor connected to the at least one image sensor and the display, the processor configured to
  - carry out facial recognition with the image acquired by the image sensor,
  - to determine positions of eyes and mouth of a face recognized in the facial recognition,
  - to compute a superimposition region in the display to superimpose the field of vision depending on the determined positions of the eyes and the mouth, the superimposition region encompassing essentially the entire field of view outside of a triangle spread out between the positions of the two eyes and the mouth, and
  - to superimpose the field of vision of the user of the device in the computed superimposition region of the display with alternative image data corresponding to altered imaging of the visual field of the device in the superimposition region, the altered imaging encompassing one or more of a change in brightness, a reduction in image resolution, a change in one or more of delineation and in contrast, and one or more of color marking and manipulation of facial traits.

8. The device according to claim 7, wherein the display is a screen or a display.

9. The device according to claim 8, wherein the device is augmented reality glasses.

10. The device according to claim 7, wherein the processor comprises facial recognition software.

11. The device according to claim 7, further comprising a biofeedback sensor, the processor being configured and connected to the biofeedback sensor to activate superimposition depending on a signal of the biofeedback sensor.

12. The device according to claim 7, further comprising a notification apparatus that is set up to deliver an optical, acoustic or haptic signal, the processor being configured and connected to the notification apparatus to initiate an optical, acoustic or haptic signal when a specific affective pattern and/or an individual assigned to a specific affect is recognized.

13. A method for changing affective visual information in a field of vision of a user of a device with at least one image sensor and at least one display, the method comprising:
- acquiring an image of a visual field of the device with the image sensor;
- facially recognizing at least one face using the acquired image;
- determining positions of eyes and mouth of the recognized face;
- computing a superimposition region in the display of the device depending on the determined positions of the eyes and the mouth, the superimposition region encompassing essentially the entire field of view inside of a triangle spread out between the positions of the two eyes and the mouth; and
- superimposing the field of vision of the user of the device in the computed superimposition region of the display with alternative image data corresponding to altered imaging of the visual field of the device in the superimposition region, the altered imaging encompassing one or more of a change in brightness, a reduction in image resolution, a change in one or more of delineation and in contrast, and one or more of color marking and manipulation of facial traits.

\* \* \* \* \*